(12) United States Patent
Schneider et al.

(10) Patent No.: US 8,595,634 B2
(45) Date of Patent: Nov. 26, 2013

(54) DISTRIBUTED HOSTING OF WEB APPLICATION STYLES

(75) Inventors: James P. Schneider, Raleigh, NC (US); Marshall Smith, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 1025 days.

(21) Appl. No.: 11/998,560

(22) Filed: Nov. 30, 2007

(65) Prior Publication Data

US 2009/0144640 A1   Jun. 4, 2009

(51) Int. Cl.
*G06F 3/00* (2006.01)
*G06F 3/01* (2006.01)
*G06F 17/21* (2006.01)

(52) U.S. Cl.
CPC ............... *G06F 3/01* (2013.01); *G06F 17/212* (2013.01)
USPC ........... 715/760; 715/235; 715/236; 715/234; 715/243; 707/E17.116; 709/203

(58) Field of Classification Search
CPC ................................. G06F 3/01; G06F 17/212
USPC .................... 715/760, 235, 236, 234, 243; 707/E17.116
See application file for complete search history.

(56) References Cited

U.S. PATENT DOCUMENTS

| | | | |
|---|---|---|---|
| 5,860,073 A * | 1/1999 | Ferrel et al. ..................... | 715/255 |
| 6,006,252 A * | 12/1999 | Wolfe ............................ | 709/203 |
| 6,101,510 A * | 8/2000 | Stone et al. ..................... | 715/234 |
| 6,456,845 B1 * | 9/2002 | Drum et al. ..................... | 455/424 |
| 7,082,476 B1 * | 7/2006 | Cohen et al. .................... | 709/246 |
| 7,519,915 B2 * | 4/2009 | Shalabi et al. .................. | 715/762 |
| 7,594,166 B1 * | 9/2009 | Ramakrishna et al. .......... | 715/234 |
| 8,020,083 B1 * | 9/2011 | Kembel et al. .................. | 715/201 |
| 8,392,828 B2 * | 3/2013 | Yoo et al. ....................... | 715/255 |
| 8,402,373 B2 * | 3/2013 | Ferlitsch ........................ | 715/733 |
| 2002/0049749 A1 * | 4/2002 | Helgeson et al. ................ | 707/3 |
| 2003/0084405 A1 * | 5/2003 | Ito et al. ......................... | 715/513 |
| 2004/0010472 A1 * | 1/2004 | Hilby et al. ..................... | 705/67 |
| 2004/0010699 A1 * | 1/2004 | Shao et al. ...................... | 713/189 |
| 2004/0111670 A1 * | 6/2004 | Sasakuma et al. .............. | 715/513 |
| 2005/0251501 A1 * | 11/2005 | Phillips et al. .................. | 707/2 |
| 2007/0157320 A1 * | 7/2007 | Collins et al. ................... | 726/27 |
| 2008/0102790 A1 * | 5/2008 | Schultz .......................... | 455/410 |
| 2008/0167886 A1 * | 7/2008 | Marcken ......................... | 705/1 |
| 2008/0288476 A1 * | 11/2008 | Kim et al. ....................... | 707/4 |
| 2009/0313116 A1 * | 12/2009 | Ashbaugh ...................... | 705/14.47 |
| 2010/0115612 A1 * | 5/2010 | O'Brien et al. .................. | 726/22 |
| 2012/0117479 A1 * | 5/2012 | Kembel et al. .................. | 715/736 |

\* cited by examiner

*Primary Examiner* — Boris Pesin
*Assistant Examiner* — Ece Hur
(74) *Attorney, Agent, or Firm* — Lowenstein Sandler LLP

(57) ABSTRACT

A method for facilitating distributed hosting of web application styles may include storing original style sheets at a first location, where the original style sheets pertain to a user interface (UI) provided by the service provider, and allowing a third party to customize a subset of the original style sheets and to store the customized style sheets at a second location. The method may further include causing the customized style sheets to be combined with the original style sheets when the user interface is presented to a user associated with the third party.

17 Claims, 5 Drawing Sheets

DISTRIBUTED HOSTING OF WEB APPLICATION STYLES

TECHNICAL FIELD

Embodiments of the present invention relate to data presentation, and more specifically to customizing web application user interfaces using style sheets.

BACKGROUND

Style sheets are used to give a common look to a collection of documents such as web pages. With style sheets, the content of a document can be separated from its presentation. Cascading Style Sheets (CSS) extend the HyperText Markup Language (HTML) and enable the precise placement of HTML document elements and the precise selection of fonts in HTML documents. CSS can be used by a web page designer to give a common look and feel to large number of documents, and to provide fonts, spacing, aural cues, etc. to structured documents (e.g., HTML documents and XML applications). An Extensible Stylesheet Language (XSL) stylesheet specifies the presentation of a class of XML documents by describing how an instance of the class is transformed into an Extensible Markup Language (XML) document that uses the formatting vocabulary.

A service provider may host style sheets that specify how its user interface (UI) should look like. A third party reseller that sells services of the service provider to customers may want to customize these style sheets to change the presentation of the UI elements. For example, a third party reseller may want to add their logo to some web pages or change the background of the web pages. Currently, the third party reseller can customize the style sheets only if the third party reseller hosts all of the style sheets provided by the service provider. However, the service provider typically continues to evolve the UI, thus affecting the UI customizations already in place.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
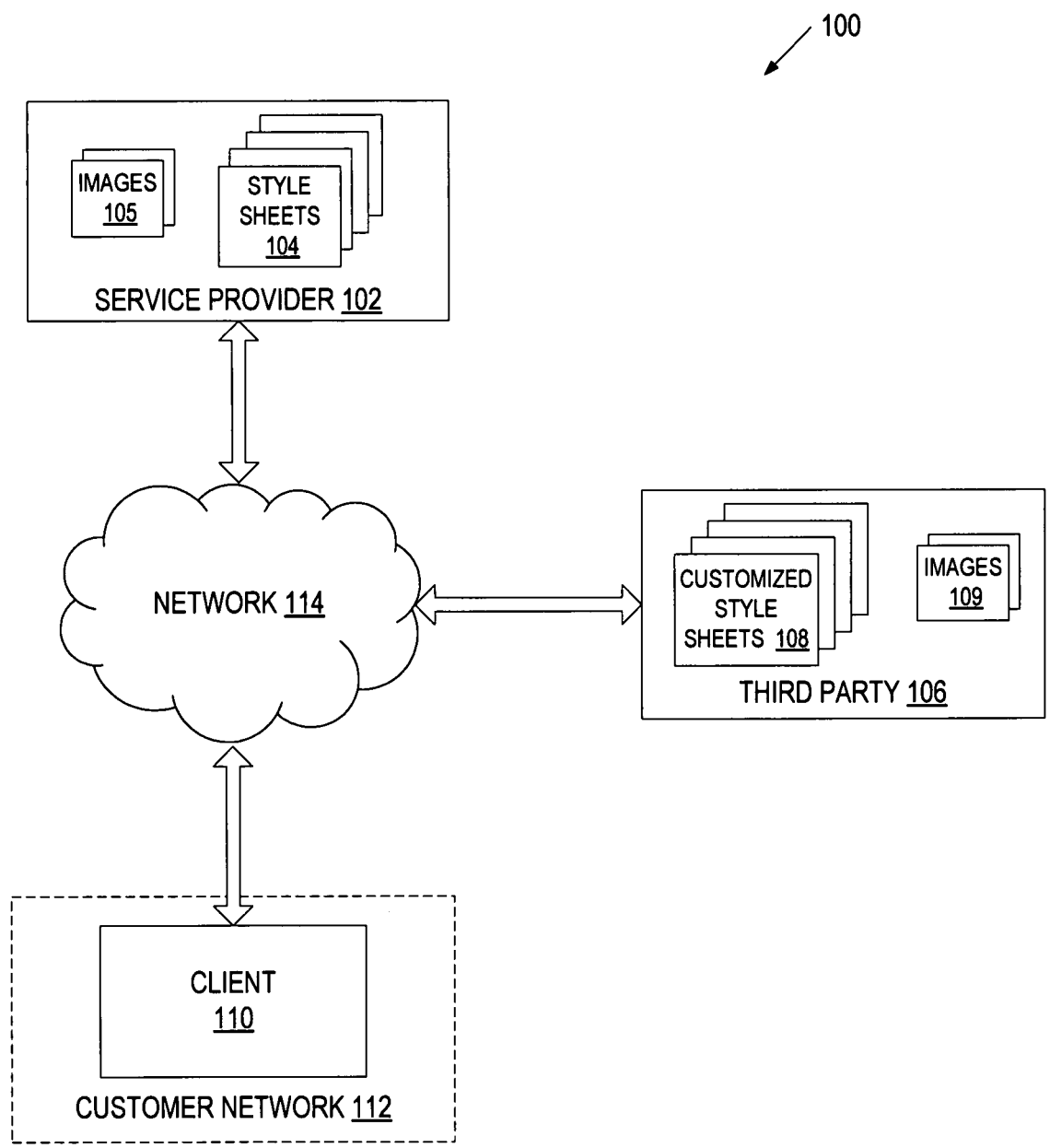
FIG. 1 illustrates an exemplary network architecture in which embodiments of the invention may operate.

Described herein is a method and apparatus for facilitating distributed hosting of web application styles. Web application styles or styling sheets may be hosted by a service provider and may be used to present UI elements in a specific way. A third party such as a reseller or a partner of the service provider may want to customize some styling sheets without hosting all of the style sheets maintained by the service provider.

Embodiments of the present invention allow a third party to customize and host only a subset of style sheets maintained by the service provider. The service provider then causes the customized style sheets to be combined with the original style sheets when the UI is presented to a user associated with the third party. In particular, the original styles sheets are used to provide a default layout of the UI and the customized style sheets are used to override specific elements of the UI.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include a service provider 102 connected with a client 110 via a network 114 (e.g., a public network such as Internet or a private network such as Intranet or a virtual private network (VPN)). The client 110 may be part of a customer network (e.g., a local area network (LAN), wide area network (WAN), etc.) that may be a network of an enterprise and may include such devices as desktop computers, laptop computers, network printers, switches, routers, gateways, firewalls, or any other devices having a network address. The client 110 may be a computing device (e.g., a desktop computer, a laptop computer, a router, etc.) that is configured to perform a network related function such as monitoring of the customer network, collecting operational characteristics of devices on the customer network, etc.

The service provider 102 provides a hosted software service. For example, the service provider 102 may provide a network monitoring service. In particular, it may receive information provided by the client 110, analyze this information, and provide alerts and various reports to an administrator of the customer network. Alternatively, the client 110 may collect other types of data, and the service provider 102 may use the client 110 to provide other services, such as banking, database management, etc. Yet alternatively, the client 110 may be configured to perform indexing of local network resources, and the service provider 102 may receive index data, store the index data in a data store and/or use the index data for the operation of its search engine. The service provider 102 may consist of one or more servers hosted by the same or different machines.

The service provider 102 may host one or more web applications to perform the above functionality and provide user interfaces (UIs) to allow interaction with the user of the client 110 and other users. The client 110 hosts a browser that presents UIs provided by these web applications to the user. The service provider 102 also hosts style sheets 104 (e.g., cascade style sheets (CSS)) that define colors, fonts, layout and other aspects of presentation of UIs. In addition, the service provider 102 hosts graphics to be included in the UI.

The service provider 102 is coupled with a third party 106 via the network 114. The third party 106 may consist of one or more servers residing on the same or different machines and may represent, for example, a reseller that sells services provided by the service provider 102, a partner of the service provider 102 that cooperates with the service provider 102 in providing functionality desired by customers, etc. The third party 106 may need to customize the UI of the web application hosted by the service provider 102. For example, the third party 106 may need to add its logo to the UI, modify the background of UI pages, etc. In one embodiment, the third party 106 requests some of the style sheets 104 from the service provider 102, customizes them, and stores customized styles sheets 104 locally or in a data store accessible to the third party 106. The third party 106 does not need to host all the style sheets 104 and may only requests those style sheets that are needed for desired modifications of the UI.

The service provider 102 ensures that UI pages presented to users associated with the third party 106 (e.g., customers of the third party 106) include modifications reflected in the customized style sheets 108. In particular, the service provider 102 creates a web page that includes a link to style sheets 104 hosted by the service provider 102 and a link to customized style sheets 108 hosted by the third party 106. When the client 110 receives this web page, it invokes the browser to present the web page to the user. When rendering the web page, the browser first uses the style sheets 104 to provide a default layout of the UI, and then uses the customized style sheets 108 to override specific elements of the UI with desired modifications (e.g., color, font, background, layout, etc.). It should be noted that the term "UI page" or "web page" referred to herein represents any file or document that can be viewed in a browser.

In one embodiment, a style sheet 104 hosted by the service provider 102 defines an image 105 using a background attribute and the address of the image 105 (e.g., the URL of the image 105). If the third party 106 desires to use a different image in the UI, the third party 106 may customize the original style sheet by defining a different image 109 hosted by the third party 106 or some other server, and then store the customized style sheet 108 locally. When the client 110 receives a web page including a link to the style sheet 104 and a link to the customized style sheet 108, it invokes the browser to present the web page to the user. When rendering the web page, the browser first uses the style sheet 104 to style the UI, and then uses the customized style sheet 108 to override the image 105 specified in the style sheet 104 with the image 109 specified in the customized style sheet 108.

Figure 2:
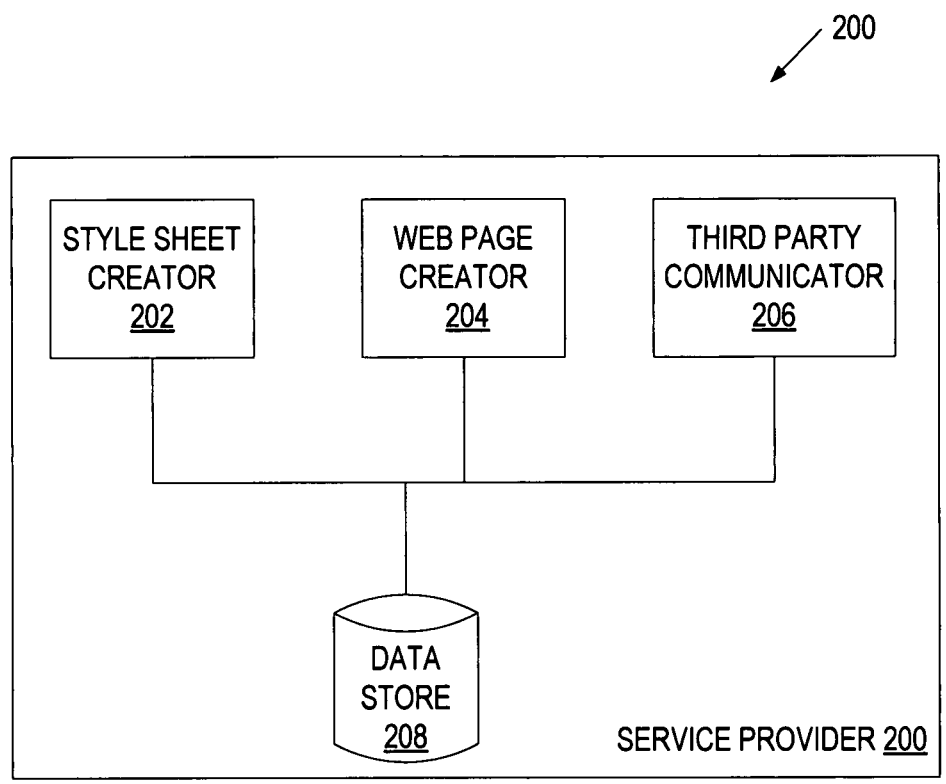
FIG. 2 illustrates a block diagram of one embodiment of a service provider system.

FIG. 2 is a block diagram of one embodiment of a service provider system 200. The system 200 may include a style sheet creator 202, a web page creator 204, a third party communicator 206, and a data store 208.

The style sheet creator 202 creates style sheets for web application UIs provided by the service provider. The style sheets are created based on user input. The created style sheets are stored in the data store 208. The data store 208 may also store graphics or images to be displayed in the UIs. The data store 208 may represent, for example, a database, a repository, a file system, or any other structure for storing data.

In one embodiment, a style sheet may be created to allow for custom images. In particular, the style sheet may reference an image indirectly, using a background attribute (defined by the CSS2 standard) and the address of the image. To prevent customization of an image, the style sheet may include the IMG tag with a direct reference to an image that should not be replaced.

The third party communicator 206 receives requests from a third party for specific style sheets from the data store 208, and sends the requested style sheets to the third party. The third party customizes these style sheets and stores them in its local data store. The third party may also host images that may be used to replace original images in the UI.

The web page creator 204 composes web pages and sends them to different clients for presentation. A web page sent to a client associated with the third party (e.g., a computer of a third party customer) includes a link to original style sheets hosted by the service provider and a link to customized style sheets hosted by the third party. During presentation, the original styles sheets are used to provide a default layout of the UI, and the customized style sheets are used to override specific elements of the UI with desired modifications (e.g., color, font, background, layout, etc.). In one embodiment, a customized style sheet may be used to override an image defined in an original style sheet with a different image hosted by the third party or some other server.

In one embodiment, the web page creator 204 creates web pages in response to corresponding user requests. Alternatively, the web page creator 204 creates web pages in advance and stores them in the data store 208.

Figure 3:
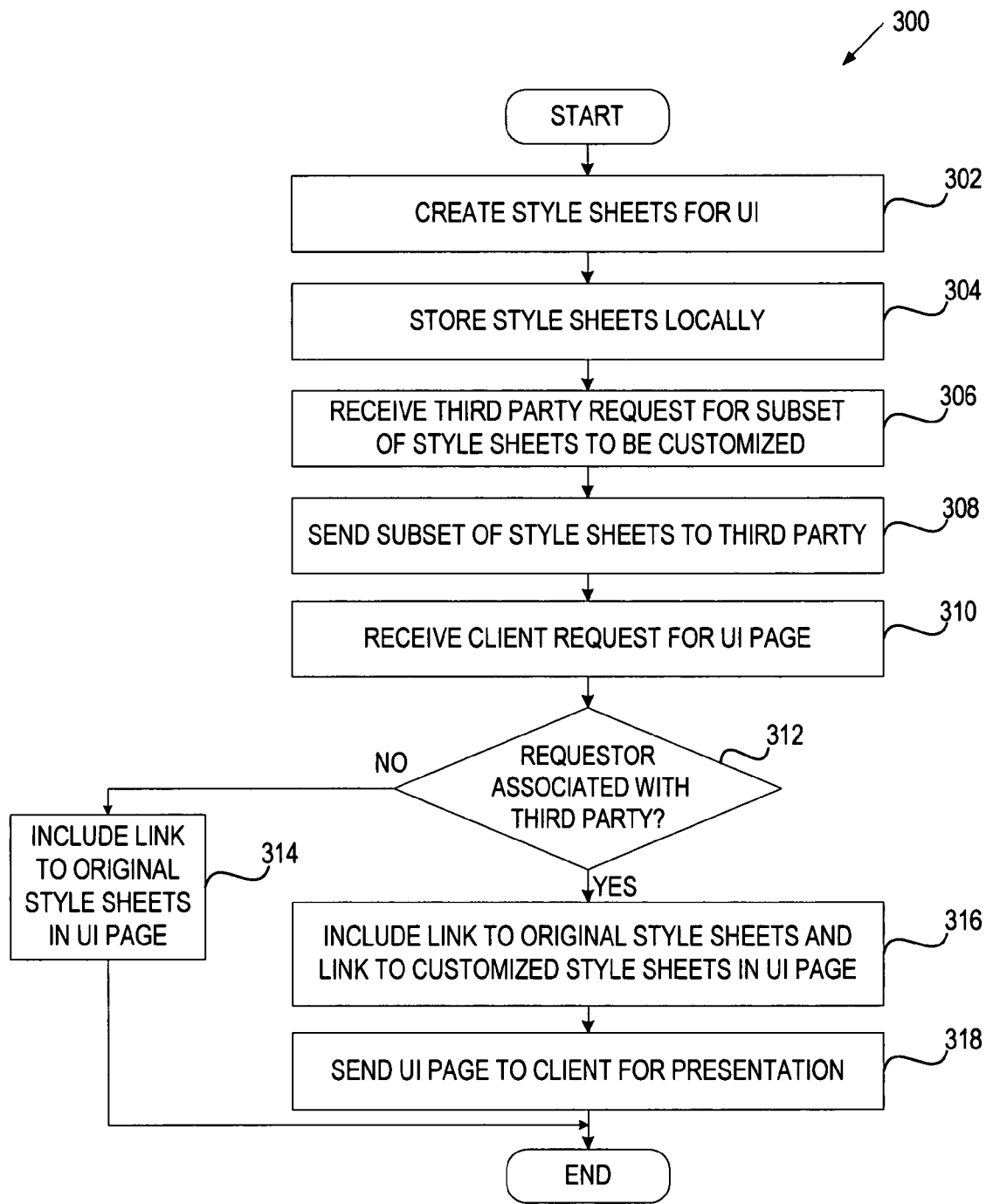
FIG. 3 illustrates a flow diagram of one embodiment of a method for facilitating distributed hosting of web application styles.

FIG. 3 illustrates a flow diagram of one embodiment of a method 300 for facilitating distributed hosting of web application styles. The method may be performed by processing logic that may comprise hardware (e.g., circuitry, dedicated logic, programmable logic, microcode, etc.), software (such as instructions run on a processing device), or a combination thereof. In one embodiment, method 300 is performed by the service provider 102 of FIG. 1.

Referring to FIG. 3, method 300 begins with processing logic creating style sheets for a UI provided by the service provider (block 302), and storing the style sheets locally (block 304). Subsequently, processing logic receives a request from a third party for a subset of the above style sheets (block 306) and sends the requested style sheets to the third party (block 308). The third party then customizes the style sheets and stores them locally. In one embodiment, processing logic receives location information pertaining to the customized style sheets and stores it locally. This location information may, for example, be an actual URL of the customized styles sheets or a default URL that includes a pointer to the actual URL of the customized style sheets.

At block 310, processing logic receives a client request for a web page. In response, processing logic determines whether the requestor is associated with the third party (block 312). If so, processing logic creates a web page with a link to original style sheets and a link to customized style sheets (block 316). If not, processing logic creates a web page with a link to original style sheets (block 314). In one embodiment, links to the style sheets are included in the HEAD section of the web page.

At block 318, processing logic sends the web page to the client for presentation. During presentation, the original styles sheets may be used to provide a default layout of the UI, and the customized style sheets may be used to override specific elements of the UI with desired modifications (e.g., color, font, background, layout, graphics, etc.).

In an alternative embodiment, the web pages with the links are created in advance, prior to receiving a client request at 310. Then, if the determination made at block 312 is negative, the web page with the link to the original style sheets is retrieved and sent to the client. Alternatively, if the determination made at block 312 is positive, the web page with both the link to the original style sheets and the link to the customized style sheets is retrieved and sent to the client.

Exemplary links included in a web page may be expressed as follows:

```
<LINK REL=StyleSheet
HREF="https://rhcc.redhat.com/provider/redhat/css/commandcenter.css">
<LINK REL=StyleSheet
HREF="https://www.thirdparty.com/css/commandcenter.css">
```

In one embodiment, the location of the "commandcenter.css" on the third party's site is hard-coded to point to a particular location in their webspace (under "/css" in the above example). This enables the service provider to define the default layout via the original style sheet, and the third party is able to override the desired elements of the UI using the customized style sheet.

In one embodiment, the service provider can add new style sheets without affecting the currently in-place overrides. The web page will still render as normal, and the failure to retrieve the customized style sheet from the third party will be silently ignored by the user's browser.

Figure 4:
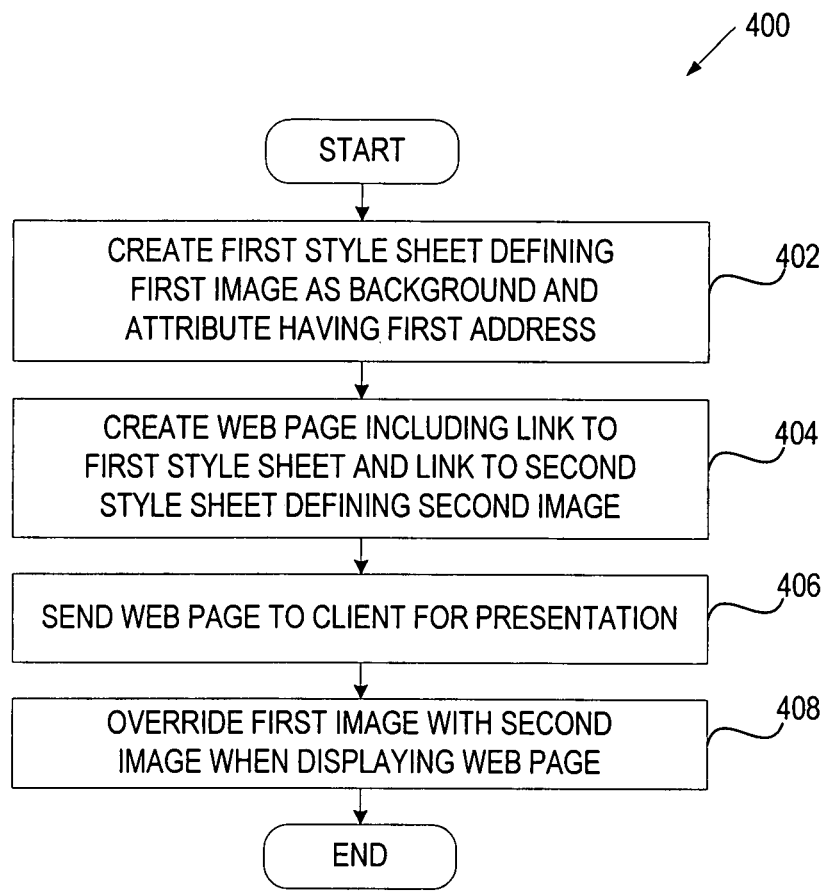
FIG. 4 illustrates a flow diagram of one embodiment of a method for overriding images displayed in a user interface.

FIG. 4 illustrates a flow diagram of one embodiment of a method 400 for overriding images displayed in a user interface. The method may be performed by processing logic that may comprise hardware (e.g., circuitry, dedicated logic, programmable logic, microcode, etc.), software (such as instructions run on a processing device), or a combination thereof. In one embodiment, method 400 is performed by the service provider 102 of FIG. 1.

Referring to FIG. 4, method 400 begins with processing logic creating a first style sheet that allows for custom images (block 402). In particular, the first style sheet may allow for a custom image by referencing the image indirectly, using a background attribute of a designated HTML element such a DIV element that defines a section in a web page, or a TD that specifies a cell within a table for a web page constructed as a table. Examples of these elements will be discussed in more detail below. The first style sheet may also specify the address (e.g., the URL) of the image to be customized. This image may be hosted by a first server (e.g., a service provider server).

At block 404, processing logic creates a web page with a link to the first style sheet and a link to a second style sheet. The second style sheet defines a second image using the background attribute of the designated HTML element and the address of the second image. The second image may be hosted by the first server or some other server (e.g., a third party server or any other server). Links to the style sheets may be included in the HEAD section of the web page.

At block 406, processing logic sends the web page to a client for presentation. When the web page is rendered by the client's browser, the first style sheet is used to provide the style of the UI and the second style sheet is used to provide the second image that overrides the first image defined in the first style sheet.

Alternatively, processing logic may disallow custom images by including in the first style sheet the IMG tag with a direct reference to an image that should not be replaced. Then, when the web page is rendered by the client's browser, the original image defined in the first style sheet will be displayed to the user. Accordingly, if desired, the web page may include images that can be overridden and/or images that cannot be overridden.

Portions of an exemplary web page and exemplary style sheets will now be discussed to illustrate customization of images. In particular, style sheet links included in the HEAD section of a web page may be expressed as follows:

```
<LINK REL=StyleSheet
HREF="http://www.serviceprovider.com/styles/main.css">
<LINK REL=StyleSheet
HREF="http://www.reseller.com/styles/main.css">
```

The above style sheets are separate (and possibly completely different), even though they have the same name and path from the root of the domain name of corresponding servers.

The body of the web page may include the following DIV element that defines a section in the web page:
<DIV ID="div_8675" CLASS="imgclass_309"></DIV>
div_8675 identifies this particular DIV, imgclass_309 specifies a particular image type. The DIV tag could optionally contain an IMG tag to a 1 pixel×1 pixel transparent image, scaled to the appropriate size. Such DIV tag can be expressed as follows:

```
<DIV ID="div_8675" CLASS="imgclass_309"><IMG
SRC="http://www.serviceprovider.com/images/trans.png"
ID="img_8657"
CLASS="transimgclass_309" BORDER=0></DIV>
```

Style sheets may assign individual images on a per-ID bases. An exemplary main style sheet referencing an original image may include the following portion for the DIV element:

```
div#div_8675 { background:
url(http://www.serviceprovider.com/images/img8675.png)
no-repeat scroll }
```

The size and location of the original image in the web page may be specified using the image class as follows:

```
div.imgclass_309 { height: 100px; width: 75px; position: absolute; top:
15px; left: 400px }
img.transimgclass_309 { height: 100px; width: 75px; }
```

A secondary style sheet referencing a second image may include the following portion for the DIV element:

```
div#div_8675 { background:
url(http://www.reseller.com/images/img8675.png)
no-repeat scroll }
```

Hence, a style sheet includes two portions dedicated to images: one portion specifies the image details, and the other portion specifies where and how the image should be presented. The second portion may also include a z-index property to make sure the images stay on top.

Alternatively, image customization may be provided using the IMG tag with a transparent single pixel image instead of the DIV element. For example, the body of the web page may include the following IMG tag:

```
<IMG SRC="http://www.serviceprovider.com/images/trans.png"
ID="img_8657" CLASS="transimgclass_309" BORDER=0>
```

An exemplary main style sheet referencing an original image may include the following portion for the IMG element:

```
img#img_8675
{ background: url(http://www.serviceprovider.com/images/img8675.png)
no-repeat scroll }
```

The size and location of the original image in the web page may be specified using the image class as follows:

```
img.transimgclass_309 { height: 100px; width: 75px; position: absolute;
top: 15px; left: 400px }
```

A secondary style sheet referencing a second image may include the following portion for the IMG element:

```
img#img_8675
{ background: url(http://www.reseller.com/images/img8675.png) no-
repeat scroll }
```

If the layout of the web page uses a table, a TD tag can be utilized. A TD tag may be nested in a TR tag, and nested in a TABLE tag. The layout can become quite complex, but it is supported on almost every browser. The TD tag may be expressed as follows:
<TD ID="td_8675" CLASS="imgclass_309"> </TD>
The style sheet portions will look similar to those described above. Yet, alternatively, the style information can be applied to an embedded IMG tag as follows:

```
<TD><IMG SRC="http://www.serviceprovider.com/images/trans.png"
ID="img_8675" CLASS="imgclass_309"></TD>
```

Again, the style sheet portions will look similar to those described above.

Figure 5:
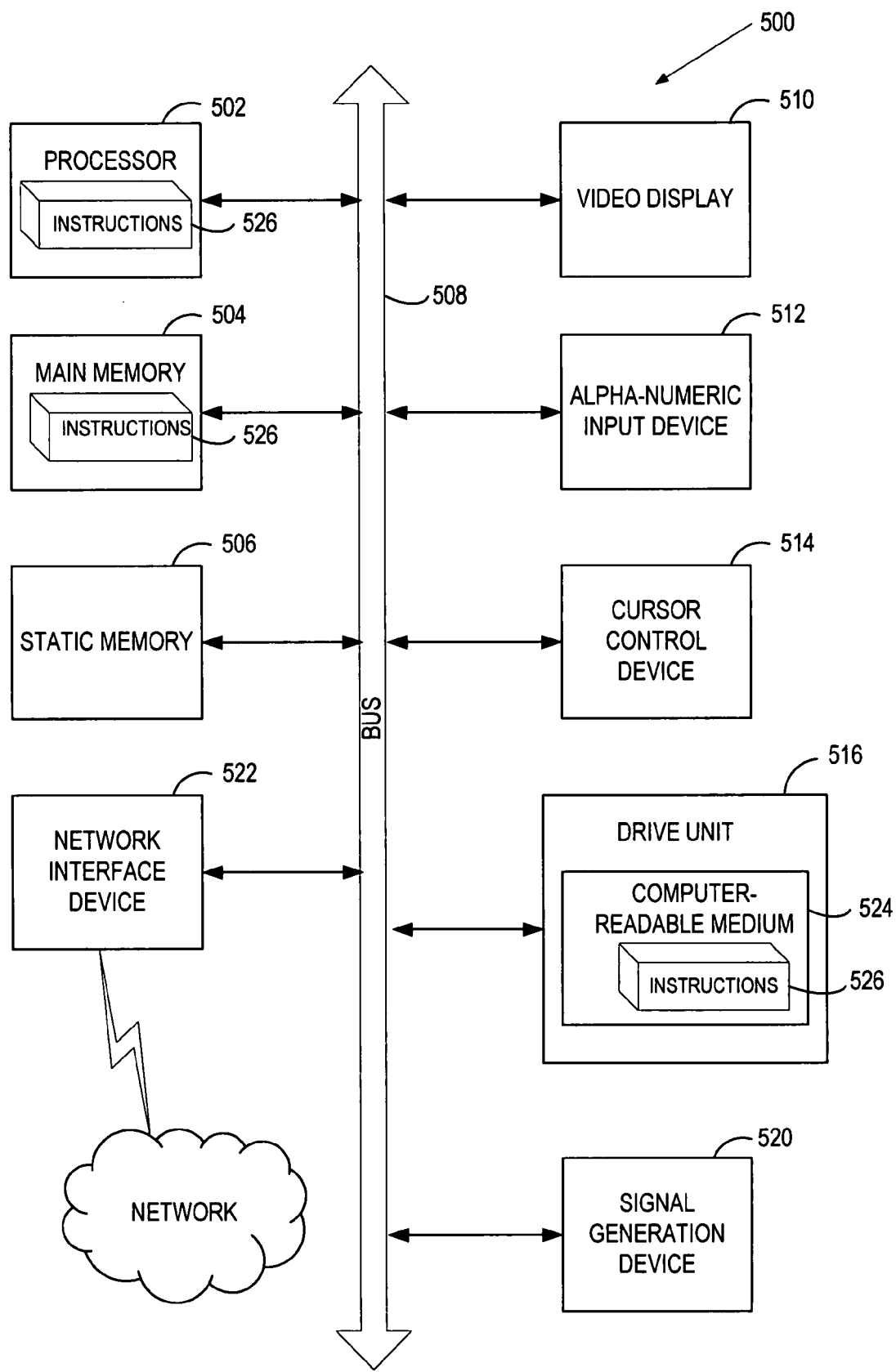
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for a service provider, comprising:
   storing a plurality of style sheets of the service provider at a first location of the service provider, the plurality of style sheets of the service provider pertaining to a user interface (UI) provided by the service provider, wherein the service provider is a provider of a network monitoring service;
   receiving, by the service provider, a request of a third party for a first subset of style sheets from the plurality of style sheets of the service provider;
   providing, by the service provider to the third party, the first subset of style sheets for customization, the first subset of style sheets to be customized by the third party and stored at a second location of the third party;
   receiving, from the third party, information identifying the second location storing the first subset of style sheets customized by the third party;
   receiving a request of a user for a user interface page pertaining to the network monitoring service;
   determining whether the user requesting the user interface page is associated with the third party; and
   if the user is associated with the third party,
      obtaining the user interface page comprising a first link to the plurality of style sheets at the first location of the service provider and a second link to the first subset of style sheets customized by the third party, and
      providing the user interface page to a user device of the user associated with the third party, the user interface page to cause the first subset of style sheets customized by the third party to be combined with the plurality of style sheets at the first location of the service provider, wherein providing the user interface page to the user device comprises sending the user interface page to a browser of the user device, the browser using the plurality of style sheets at the first location to provide a default layout of the user interface and using the first subset of style sheets customized by the third party to override corresponding user interface elements when the user interface page is presented to the user associated with the third party.

2. The method of claim 1 wherein the first location is hosted by the service provider and the second location is hosted by the third party.

3. The method of claim 1 wherein:
   the user interface is part of the network monitoring service.

4. The method of claim 1 wherein the third party is a service reseller or a partner of the service provider.

5. The method of the claim 1 wherein:
   the UI page is an HTML document; and
   the first and second links are included in a HEAD section of the HTML document.

6. The method of claim 1 wherein a name and path in the second link defines a location at the third party that points to the second location.

7. The method of claim 1 further comprising:
   adding a new style sheet to the plurality of styles sheets at the first location; and causing the UI to be presented based on the new style sheet.

8. A system comprising:
   a storage device hosting a data store to store a plurality of style sheets at a first location of a service provider, the plurality of style sheets pertaining to a user interface (UI) provided by the service provider, wherein the service provider is a provider of a network monitoring service;

a processor, coupled to the storage device, the processor to cause:

a third party communicator to receive a request of a third party for a first subset of the plurality of style sheets, and to provide the third party the first subset of the plurality of style sheets for customization, the first subset of style sheets to be customized by the third party and stored at a second location of the third party, and to receive information identifying the second location storing the first subset of style sheets customized by the third party; and a web page creator to receive a request of a user for a user interface page pertaining to the network monitoring service, to determine whether the user is associated with the third party, and if the user is associated with the third party, to obtain the user interface page comprising a first link to the plurality of style sheets at the first location of the service provider and a second link to the first subset of style sheets customized by the third party, and to provide the user interface page to a user device of the user associated with the third party, the user interface page to cause the first subset of style sheets customized by the third party to be combined with the plurality of style sheets at the first location of the service provider, wherein providing the user interface page to the user device comprises sending the user interface page to a browser of the user device, the browser using the plurality of style sheets at the first location to provide a default layout of the user interface and using the first subset of style sheets customized by the third party to override corresponding user interface elements when the user interface page is presented to the user associated with the third party.

9. The system of claim 8 wherein the first location is hosted by the service provider and the second location is hosted by the third party.

10. The system of claim 8 wherein:
the user interface is part of the network monitoring service.

11. The system of claim 8 wherein the third party is a service reseller or a partner of the service provider.

12. The system of claim 8 wherein:
the UI page is an HTML document; and the first and second links are included in a HEAD section of the HTML document.

13. The system of claim 8 wherein:
the data store is further to store a new style sheet added to the plurality of styles sheets at the first location; and
the web page creator is further to cause the UI to be presented based on the new style sheet.

14. A non-transitory computer-readable storage medium including data that, when accessed by a machine, cause the machine to perform a method comprising:
storing a plurality of style sheets of a service provider at a first location of the service provider, the plurality of style sheets of the service provider pertaining to a user interface (UI) provided by the service provider, wherein the service provider is a provider of a network monitoring service;

receiving, by the service provider, a request of a third party for a first subset of style sheets from the plurality of style sheets of the service provider;

providing, by the service provider to the third party, the first subset of style sheets for customization, the first subset of style sheets to be customized by the third party and stored at a second location of the third party;

receiving, from the third party, information identifying the second location storing the first subset of style sheets customized by the third party;

receiving a request of a user for a user interface page pertaining to the network monitoring service;

determining whether the user requesting the user interface page is associated with the third party; and if the user is associated with the third party,
obtaining the user interface page comprising a first link to the plurality of style sheets at the first location of the service provider and a second link to the first subset of style sheets customized by the third party, and
providing the user interface page to a user device of the user associated with the third party, the user interface page to cause the first subset of style sheets customized by the third party to be combined with the plurality of style sheets at the first location of the service provider, wherein providing the user interface page to the user device comprises sending the user interface page to a browser of the user device, the browser using the plurality of style sheets at the first location to provide a default layout of the user interface and using the first subset of style sheets customized by the third party to override corresponding user interface elements when the user interface page is presented to the user associated with the third party.

15. The computer-readable storage medium of claim 14 wherein: the first location is hosted by the service provider and the second location is hosted by the third party;
the user interface is part of the network monitoring service; and
the third party is a service reseller or a partner of the service provider.

16. The computer-readable storage medium of claim 14 wherein: the UI page is an HTML document; and
the first and second links are included in a HEAD section of the HTML document.

17. The computer-readable storage medium of claim 14 wherein the method further comprises:
adding a new style sheet to the plurality of styles sheets at the first location; and causing the UI to be presented based on the new style sheet.

* * * * *